April 11, 1967     J. P. NIELSEN     3,313,043
DEMONSTRATION SYSTEM
Filed July 28, 1964
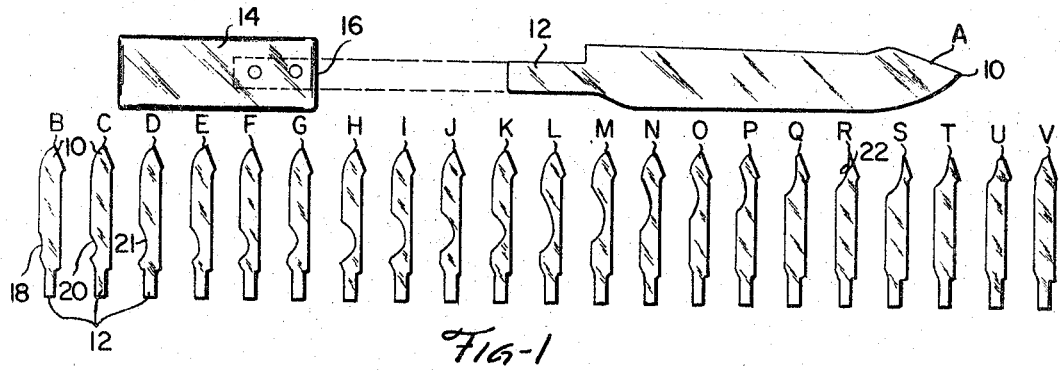
FIG-1
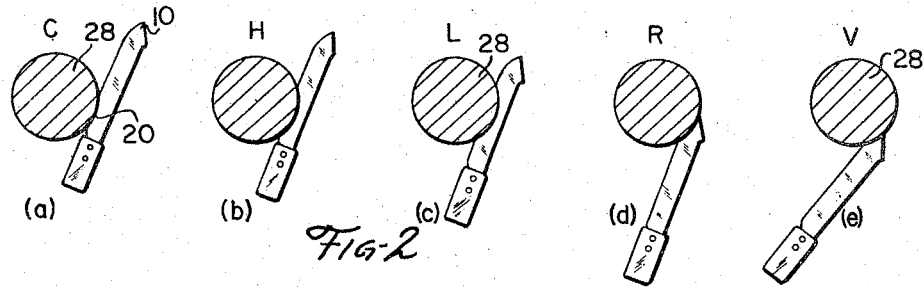
FIG-2
FIG-3
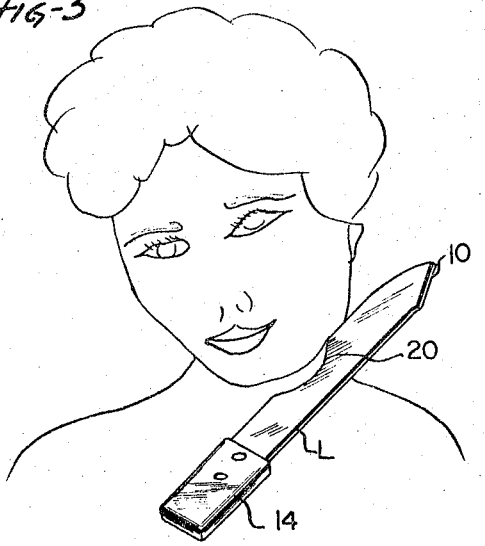
FIG-4
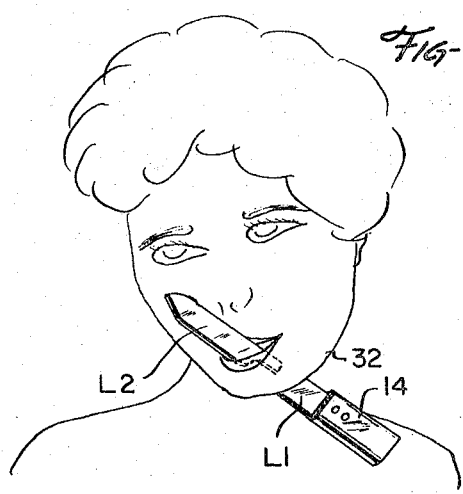
FIG-5
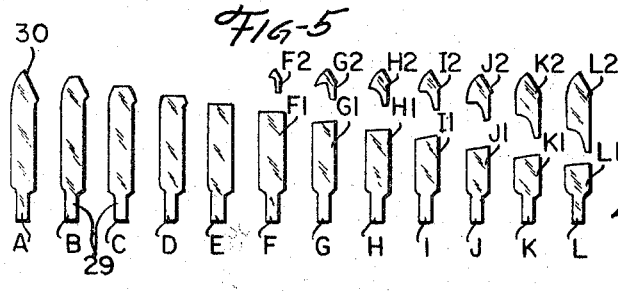
INVENTOR
Jimmy P. Nielsen
BY Wilson, Robbins & Anderson
ATTORNEYS

United States Patent Office 3,313,043
Patented Apr. 11, 1967

3,313,043
DEMONSTRATION SYSTEM
Jimmy P. Neilsen, 1227A E. Harvard Ave.,
Glendale, Calif. 91205
Filed July 28, 1964, Ser. No. 385,611
7 Claims. (Cl. 35—28)

The present invention relates to a demonstration system, and particularly to a system for giving the appearance that one solid object is passing into another, so as to produce a motion picture sequence of such demonstration, without actually penetrating the object that appears to have been penetrated.

The need often arises, as for example in motion picture photography, to demonstrate the penetration of one solid object by another solid object while the former is actually preserved whole. As a specific example, it is sometimes desired to provide a motion picture sequence showing the penetration of a human body by a knife or other cutting instrument. Motion picture sequences of this type may be very useful for visual medical instruction as in the field of surgery. Of course, actual surgery can be photographed to provide the desired sequence, however, such a method of making motion pictures has several major disadvantages. The operation of cameras in a surgery is somewhat distracting to the surgeon and his assistants, and furthermore, the presence of massive auxiliary equipment along with an environment which is somewhat distracting, hamper the production of good motion pictures for teaching purposes. In this regard, it is also quite impossible to show variations and alternative cutting techniques in film made during actual surgery. Therefore, a need exists for a system to produce motion pictures, as of surgery, or otherwise exhibiting the penetration of a body by a solid object or cutting tool, in which no actual penetration occurs, and in which the filming sequence may be interrupted and variously arranged to provide a desired effect in the motion picture presentation. Of course, the system hereof also has application in producing other motion picture sequences, as for instruction or entertainment related to subjects different from surgery, as considered above.

In accordance with these considerations, an object of the present invention is to provide an improved system for producing motion pictures, wherein one object realistically appears to penetrate a second object, without the need to actually penetrate the second object with the first object.

Another object of the present invention is to provide an improved system for making motion picture sequences wherein a cutting instrument appears to penetrate a human body, and may even emerge from the body, which system may be used economically and without the need to actually penetrate the human body.

Still another object of the present invention is to provide a series of tools resembling predetermined and differsent portions of a cutting instrument, which serve to matingly engage a part of the human body, and which are capable of use to present a sequence that may be photographed to realistically depict the insertion of one such instrument into a human body.

One further object of the present invention is to provide a demonstration apparatus for depicting the stages of cutting an integral object, such as a human body, with a cutting instrument, which stages may be photographed to form a motion picture sequence that realistically shows the desired cutting operation, yet, without actually penetrating the integral object, and which structure includes a plurality of individual tools each resembling a portion of the cutting instrument, and each defining a void of progressively changing size and position so that the void in each tool is progressively displaced along the tool of the cutting instrument to realistically mate with the integral object to provide the appearance of cutting in a composite sequence of views.

These and other objects and advantages of the present invention will be apparent from the consideration of the following, taken in conjunction with the drawing; wherein:

FIGURE 1 is a plan view of the composite structures in accordance with the present invention to provide a desired demonstration sequence;

FIGURE 2 is a series of similar sectional views, demonstrating the manner in which the apparatus of FIGURE 1 is employed;

FIGURE 3 is a perspective view showing one stage of using the apparatus of FIGURE 1;

FIGURE 4 is a perspective view showing a stage of using an alternative structure of the present invention; and FIGURE 5 is a plan view showing an alternative structure of the present invention.

Referring initially to FIGURE 1, there is shown one system for practicing the present invention with the interrelated components thereof positioned in the order of progression in which they are used. In general, the individual components of the structure illustrated in FIGURE 1 each defines a void which may be mated against an integral object, e.g. human body, so that upon photographing each component so positioned on one frame of motion picture film, a sequence may be obtained exhibiting the entry of a knife into a body.

Considering FIGURE 1 in greater detail, there is shown a tool A simulating a full knife blade. Remote the point 10 of the tool A is an extension 12 serving as a connection means for mating relationship between the tool A and a holder or handle 14. The handle 14 contains a slot 16 to matably receive the extension 12 removably coupling the tool A into the handle 14.

The handle 14 may be formed of wood, metal, plastic, or various other materials and may be manufactured to resemble the instrument desired to be demonstrated. Similarly, the tool A may be formed of various materials which are sufficiently rigid to maintain shape, and may be made to appear as the cutting instrument employed in the demonstration. Specifically, for example, the tool A may be formed of plastic, wood, metal, and so on. In general, it is important that the extension 14 of the tool A be formed to snugly fit within the slot 16 of the handle 14 to accomplish the appearance that the two components are rigidly interconnected while mated; while in fact, the tool A may be easily withdrawn from the handle 14.

The handle 14 is used in accordance with the present invention in association with a series of tools comprising a portion of the tool A. Specifically, the additional tools of the complete apparatus are shown in FIGURE 1 identified alphabetically in their order of use as B through V. Each of the tools B through V may be formed of materials similar to the tool A, and include a connecting extension 12. Furthermore, each of these tools define a void which may be progressively mated with an increased section of the body used in the demonstration, so as to provide the illusion that the tools are penetrating the body.

The tool B contains a shallow recess 18 defined remote the point 10, i.e. adjacent the extension 12. The tool C then defines a recess 20 extending into the tool a greater depth, and slightly displaced from the extension 12. Next in the progression, the tool D defines a recess 21 extending into the tool to a greater depth and still more removed from the extension 12 thereon. Thus, the recesses in each of the tools B through P extend to a slightly greater depth into the tool and are displaced away from the extension 12 toward the tip 10.

The tool R defines a portion of the tool A in which the tip is void as it would normally occupy the position of a recess 22 which, again conforms to the body with which the illusion is desired. The recess thus is progressively displaced in the tools S, T, U and V so as to move off the tool with the tool V being a substantially full form of the cutting instrument represented by the tool A.

Considering the use of the apparatus as shown in FIGURE 1, the tool A is first connected to the handle 14 by inserting the extension 12 into the recess 16 and placing the edge 26 (simulating the cutting edge) of the tool A contiguous the object into which it is desired to demonstrate the passage of a cutting instrument. With the tool A so positioned and held (as manually) a frame of motion picture film is exposed. Then with the handle 14 held steady, the tool A is withdrawn therefrom to be replaced by the tool B with the recess 18 receiving the object of cutting. A frame of motion picture film is then exposed with the recess 18 in the tool B lying contiguous the object in which the related penetration is to be demonstrated. Next, the tool B is replaced by the tool C, the recess of which is again held contiguous to the object. This stage of the operation is illustrated in FIGURE 2a showing the object 28 with the recess 20 contiguous thereto to provide the illusion of having penetrated the object 28. The FIGURE 2b shows a subsequent stage in the process, with further subsequent stages shown in FIGURES 2c, 2d and 2e. It is to be noted, as shown in FIGURE 3, that the illusion is clearly created that the tools representing a cutting instrument actually pass into the object 20. Thus, the knife simulated appears to have sliced into the object 20 as it is drawn across it. Of course, a return stroke may be simulated by using the instruments or tools in reverse order.

As the operation is carried out in accordance with the present invention, a frame of motion picture film is exposed with the recess of each of the tools A through V contiguous to the object 20, so that the recess of the tool e.g. recess 21, is in mating relationship with the object 20, i.e. receiving a segment of the object 20. Upon the completion of the operation, the exposed strip of motion picture film provides a moving sequence demonstrative of the instrument simulated to penetrate the object, yet, of course, no actual penetration occurs. Thus, it is apparent that desired penetrations may be demonstrated in a studied fashion, without the distractions attendant actual surgery, with the opportunity of carefully placing the simulated instrument during each stage to accurately illustrate a desired technique, and of course, without the limitations of awaiting the occurrence of a desired surgery, and the danger of distracting the surgeon or his staff.

In addition to the apparatus as shown in FIGURE 1 and the technique as described above that may be employed in conjunction with such apparatus, the system of the present invention may also be readily used to demonstrate and exhibit other techniques. For example, FIGURE 5 shows a series of tools A through L, alphabetically designated in their order of use, several of which are divided into two separate components specifically F1 and F2, G1 and G2, H1 and H2, I1 and I2, J1 and J2, K1 and K2, and L1 and L2.

This set of tools of FIGURE 5 may include individual components manufactured similarly and of similar material to the tools shown in FIGURE 1 and are usable in conjunction with a handle similar to the handle 14 as previously described. However, the set of tools shown in FIGURE 5 are employed to accomplish an effect as illustrated in FIGURE 4, wherein a portion of the cutting instrument at the leading edge is made to appear as emerging from a body opening or other opening in an integral subject.

In using the set of tools as shown in FIGURE 5, the first tool A in the sequence is set with the extension 29 in the handle 14 and with the point 30 in penetrating relationship to the object 32. A frame of motion picture film is exposed then the tool A is replaced by the tool B in the handle 14 and a second frame of motion picture film is exposed, again with the end of the tool remote the handle contiguous the object. Each of the tools C through D are then used to similarly account for one frame of motion picture film.

Next, the section F1 of the tool F is placed in the handle 14 while the tip section F2 of the tool F is placed and held in the opening (mouth for example) of the subject in alignment with the section F1. With the components so placed, another frame of motion picture film is exposed and the subsequent tools G through L are similarly used to account for a sequence of motion picture film with a frame for each tool. It is to be noted, that FIGURE 4 shows the position of the tool L with sections L1 and L2 extending from the subject 32 to demonstrate the puncture under consideration.

It is therefore apparent, that the system of the present invention may be employed to accomplish demonstration wherein the penetrating portion of the instrument is completely concealed within the object through which penetration is simulated or emerges therefrom. The latter technique normally requires the provision of sectioned tools as the tools F through L shown in FIGURE 5. Thus, further realism and flexibility of use is possible with the system of the present invention along with the other advantages previously described. The realism accomplished in employing the system of the present invention is enhanced by the displacement of the recess or aperture in the tool from one stage to the next so as to guide and accomplish the desired pattern of movement in a motion picture film. That is, as shown in FIGURE 1, it is to be noted that each recess in the tools B through V is incrementally displaced to accomplish an apparent pattern of motion for the cutting instrument.

Another important feature of the present invention resides in the provision of a handle which may be held stationary or steady during a long sequence of filming to reference the position of the cutting instrument while individual tools with different recesses are sequentially placed in the handle to be individually photographed.

Of course, these features may be provided in a wide variety of cutting instruments for demonstration in association with a wide variety of subjects. However, it is to be understood that the progressive positioning of the recesses in the tools and the segmenting of the tools afford important features of the present invention.

Other important features of the present invention will be readily apparent to those skilled in the art along with various modifications which may be adapted from the system described herein; however, it is to be understood that the scope of the present invention is to be defined not by the embodiments described herein but rather, in accordance with the claims as set forth below.

What is claimed is:

1. A demonstration apparatus to demonstrate the passage of a cutting instrument into an integral object, without said cutting instrument penetrating said integral object, comprising:
   a plurality of individual tools, each comprising a portion of said cutting instrument and defining a void to mate with a progressively increased section of said integral object; and
   a holder for receiving each of said individual tools in sequence, to establish a reference position therefor.

2. A demonstration apparatus to demonstrate the passage of a cutting instrument into an integral object, without said cutting instrument penetrating said integral object, comprising:
   a plurality of individual tools, each comprising a portion of said cutting instrument and defining a void to mate with a progressively increased section of said integral object and said tools each further including connection means; and
   a holder for mating with said connection means of said tools to receive each of said tools in sequence to establish a reference position therefor.

3. An apparatus according to claim 2 wherein said tools each define a different void progressively displaced along said tool as a cutting instrument.

4. An apparatus according to claim 2 wherein said tools each define a different void, progressively displaced along said tool as a cutting instrument, and of progressively related varying size.

5. A demonstration apparatus for picturing the stages of cutting an integral object with a cutting instrument, to form a motion picture of such cutting, without actually penetrating said integral object, comprising:
 a plurality of individual tools, each resembling a portion of said cutting instrument and defining a void of progressively changing size and position so that the void in each tool is progressively displaced along said tool as a cutting instrument, and of progressively related varying size, said tools further each including connection means; and
 a holder for mating with said connection means of said tools to receive each of said tools in sequence to establish a reference position therefor.

6. A demonstration apparatus for picturing the stages of inserting a knife into an integral object so as to emerge from said object through an existing opening, so as to photograph a motion picture of said operation, said demonstration being accomplished without puncturing said object, comprising:
 a first tool shaped to define a form resembling said knife;
 a second tool shaped to define a partial form of said knife less the tip thereof;
 at least one third tool shaped to define a partial form of said knife less a greater section thereof at the tip end; and
 at least one fourth tool shaped to define a partial form of the tip of said knife and adapted to be placed in said existing opening of said object.

7. A demonstration apparatus for picturing the stages of inserting a knife into an integral object so as to emerge from said object through an existing opening, so as to photograph a motion picture of said operation, said demonstration being accomplished without puncturing said object, comprising:
 a first tool shaped to define a form resembling said knife;
 a second tool shaped to define a partial form of said knife less the tip thereof;
 at least one third tool shaped to define a partial form of said knife less a greater section thereof at the tip end;
 at least one fourth tool shaped to define a partial form of the tip of said knife and adapted to be placed in said existing opening of said object; and
 a holder for receiving each of said individual first, second and third tools to establish a reference position therefor.

References Cited by the Examiner

UNITED STATES PATENTS

| | | | |
|---|---|---|---|
| 2,327,059 | 8/1943 | Pal | 352—54 |
| 2,413,082 | 12/1946 | Skaer | 30—125 |
| 2,976,039 | 3/1961 | Chouinard | 272—8 |
| 3,132,859 | 5/1964 | Brounhut | 272—8 |

EUGENE R. CAPOZIO, *Primary Examiner.*

H. S. SKOGQUIST, *Assistant Examiner.*